June 16, 1942.     O. W. LANE     2,286,969
MEANS FOR MOVABLY CONNECTING ONE MEMBER TO ANOTHER MEMBER
Filed Sept. 6, 1941
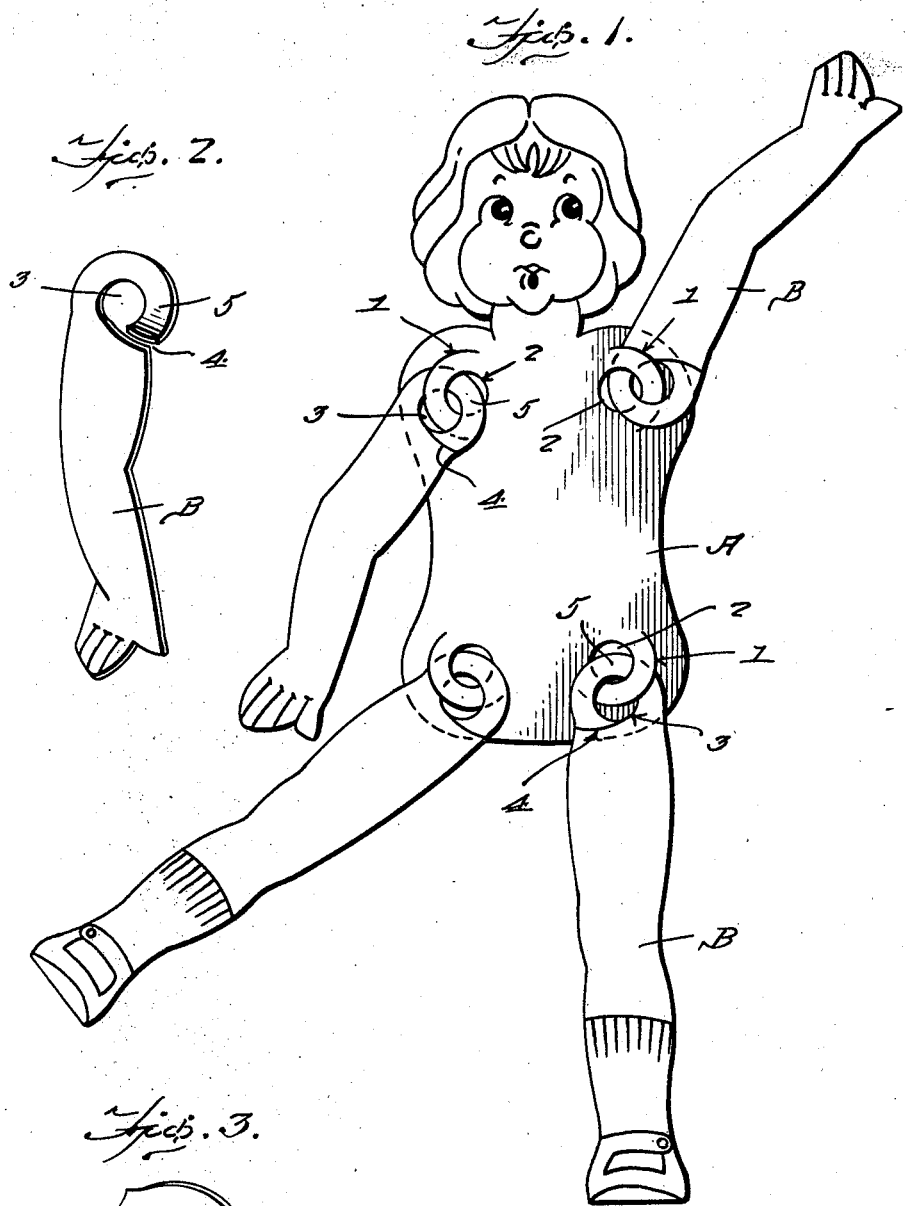
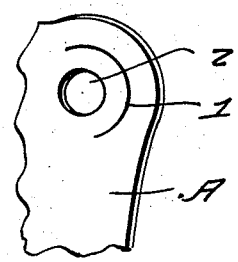
Inventor
Olive Winnifred Lane
By *Clarence A. O'Brien*
Attorney Patented June 16, 1942

2,286,969

UNITED STATES PATENT OFFICE 2,286,969

MEANS FOR MOVABLY CONNECTING ONE MEMBER TO ANOTHER MEMBER

Olive Winnifred Lane, Lynn, Mass.

Application September 6, 1941, Serial No. 409,884

3 Claims. (Cl. 46—161)

This invention relates to means for connecting one member to another member so that the members are movably connected together and can be moved into various positions relative to each other, the invention specifically relating to means for connecting the limbs of a doll to the body thereof.

This invention also consists in certain other features of construction and in the combination and arrangement of the several parts to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a view of a doll constructed in accordance with the present invention.

Figure 2 is a view of one of the arms of a doll.

Figure 3 is a fragmentary view showing the shoulder portion of the body of a doll to which an arm is to be connected.

In carrying out the invention one member A, which is shown in the drawing as being the body of a doll is cut adjacent an edge part thereof with a semi-circular cut 1 and a circular hole 2 is made in this portion, the hole being concentric to the cut or slit 1 and substantially half of the hole being in the area defined by the cut 1. The other member B has a rounded extremity in which is formed a hole 3 which is concentric to the rounded part and a slit 4 extends tangentially from the hole through an edge portion of the member B. Thus the free end of the part 5 formed by the hole 3 and the rounded extremity of the part B can be passed into the hole 2 and one part turned relative to the other to cause the parts to interlock as shown in Figure 1. As will be seen in Figure 1 a portion of the extremity of the member B having the hole 3 therein passes through the slit 1 and another portion through the hole with still another portion passing over the portion of the part A between the slit 1 and the hole 2. As will be seen from Figure 1 the two arms and the two legs of the doll are fastened to the body at the four corners thereof by this method so that the arms and legs can move into various positions relatively to the body.

By this invention the parts have facility of movement, they can be interchanged and the invention eliminates the use of paste or other adhesive and the parts can be formed of any material, such as paper, cardboard, plastic, etc.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. The method of connecting one member to another member consisting in making a substantially semi-circular slit in one member and forming a circular hole in said one member which is concentric to the slit with substantially half of the hole in the area formed by the slit, rounding one end of the second member and forming a circular hole in the rounded end, said hole being concentric to the rounded end and forming a slit which extends tangentially from the hole in the second member to an edge of the rounded end and then inserting the portion formed by the hole and the rounded end and the slit of the second member into the hole and slit of the first member.

2. In a device of the class described, a first member having a rounded end provided with a concentric opening and a slit extending from the opening through the edge of the rounded part to provide a substantially semi-circular tongue, a second member having a hole adjacent an edge part thereof and a substantially semi-circular slit between the hole and the edge part, the slit being concentric with the hole, the tongue of the first part being adapted to be passed through the slit and into the hole of the second member and movably connect the two members together.

3. A doll of the class described comprising a body of flat material and said body having a hole and a substantially semi-circular slit in each corner thereof, each hole and slit forming a semi-circular strip, a pair of arms and a pair of legs for the doll each of which has a rounded extremity having a hole therein and a slit extending from the hole through an edge portion of the rounded extremity to form a substantially semi-circular tongue, said tongue being passed through a slit and through the adjacent hole for movably connecting a limb with the body.

OLIVE WINNIFRED LANE.